(12) United States Patent             (10) Patent No.:     US 11,257,439 B2
Guo et al.                            (45) Date of Patent:         Feb. 22, 2022

(54) DATA TRANSMISSION METHOD AND DEVICE, DISPLAY SCREEN, AND DISPLAY DEVICE

(71) Applicants: Beijing BOE Display Technology Co., Ltd., Beijing (CN); BOE Technology Group Co., Ltd., Beijing (CN)

(72) Inventors: Zhijie Guo, Beijing (CN); Ming Chen, Beijing (CN); Jieqiong Wang, Beijing (CN); Hsinchung Lo, Beijing (CN); Hao Zhu, Beijing (CN); Xin Duan, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/768,715

(22) PCT Filed: Jan. 4, 2019

(86) PCT No.: PCT/CN2019/070455
§ 371 (c)(1),
(2) Date: Jun. 1, 2020

(87) PCT Pub. No.: WO2019/205735
PCT Pub. Date: Oct. 31, 2019

(65) Prior Publication Data
US 2021/0174749 A1    Jun. 10, 2021

(30) Foreign Application Priority Data
Apr. 24, 2018    (CN) .......................... 201810371292.8

(51) Int. Cl.
G09G 3/3275    (2016.01)
G06F 3/041     (2006.01)
G09G 3/36      (2006.01)

(52) U.S. Cl.
CPC ......... G09G 3/3275 (2013.01); G06F 3/0416 (2013.01); G09G 3/3685 (2013.01); *G09G 2310/08* (2013.01); *G09G 2354/00* (2013.01)

(58) Field of Classification Search
CPC ........... G09G 2310/08; G09G 2354/00; G09G 3/3685; G09G 3/3275; G09G 2370/00; G09G 2370/14; G06F 3/0416
See application file for complete search history.

(56) References Cited

U.S. PATENT DOCUMENTS 5,448,562 A    9/1995 Osakabe et al.
6,564,269 B1   5/2003 Martin
              (Continued)

FOREIGN PATENT DOCUMENTS

CN    1091851 A     9/1994
CN    101777323 A   7/2010
              (Continued)

OTHER PUBLICATIONS

International search report of PCT application No. PCT/CN2019/070455 dated Mar. 27, 2019.
(Continued)

*Primary Examiner* — Hong Zhou
(74) *Attorney, Agent, or Firm* — Fay Sharpe LLP

(57)    ABSTRACT

The present disclosure relates to a data transmission method and device, a display screen, and a display device, and belongs to the application field of display technology. The method is applicable to a first drive chip in a display device that includes a controller, a plurality of drive chips and a data acquisition apparatus. The first drive chip is one of the (Continued)

plurality of drive chips and connected to the controller and the data acquisition apparatus respectively. The method includes: receiving component-related data acquired by the data acquisition apparatus; and sending backhaul data to the controller, the backhaul data including the component-related data. The present disclosure solves the problem of function singleness of the drive chip. The present disclosure is applicable to drive and control the display device.

14 Claims, 7 Drawing Sheets

(56) References Cited

U.S. PATENT DOCUMENTS

| | | | |
|---|---|---|---|
| 9,857,911 B1* | 1/2018 | Qu | G06F 3/04166 |
| 2003/0038770 A1 | 2/2003 | Lee et al. | |
| 2007/0061491 A1* | 3/2007 | Kerdemelidis | G06F 3/0227 |
| | | | 710/1 |
| 2007/0063991 A1 | 3/2007 | Lee et al. | |
| 2007/0186021 A1* | 8/2007 | Drexler | G06F 13/24 |
| | | | 710/260 |
| 2012/0294463 A1* | 11/2012 | Chu | H04M 1/6041 |
| | | | 381/150 |
| 2013/0050302 A1* | 2/2013 | Su | G09G 3/20 |
| | | | 345/691 |
| 2013/0093680 A1* | 4/2013 | Ogita | G06F 1/1626 |
| | | | 345/168 |
| 2014/0140390 A1* | 5/2014 | Kashima | H04L 7/065 |
| | | | 375/238 |
| 2017/0193877 A1* | 7/2017 | Lee | G09G 3/3291 |
| 2017/0200432 A1 | 7/2017 | Hsu et al. | |
| 2017/0229055 A1 | 8/2017 | Hu et al. | |
| 2018/0061304 A1 | 3/2018 | Wang | |
| 2018/0190218 A1* | 7/2018 | Jang | G09G 3/3611 |

FOREIGN PATENT DOCUMENTS

| | | |
|---|---|---|
| CN | 102693695 A | 9/2012 |
| CN | 103680374 A | 3/2014 |
| CN | 105528989 A | 4/2016 |
| CN | 105869591 A | 8/2016 |
| CN | 107045847 A | 8/2017 |
| CN | 107481674 A | 12/2017 |

OTHER PUBLICATIONS

First office action of Chinese application No. 201810371292.8 dated Dec. 28, 2021.

* cited by examiner

DATA TRANSMISSION METHOD AND DEVICE, DISPLAY SCREEN, AND DISPLAY DEVICE

CROSS-REFERENCE TO RELATED APPLICATION

The present disclosure is a 371 of PCT Application No. PCT/CN2019/070455, filed on Jan. 4, 2019, which claims priority to Chinese Patent Application No. 201810371292.8, filed on Apr. 24, 2018 and entitle "DATA TRANSMISSION METHOD AND DEVICE, AND DISPLAY DEVICE", the entire contents of which are incorporated herein by reference.

TECHNICAL FIELD

The present disclosure relates to the technical field of display, and more particularly, relates to a data transmission method and device, a display screen, and a display device.

BACKGROUND

The display screen in the display device includes a display panel and a panel drive circuit. The panel drive circuit typically includes a timing controller, a source driver that includes a plurality of source drive chips, and a gate driver that includes a plurality of gate drive chips.

At present, the drive chips in the display device can only perform operations of voltage data writing and the like under the control of the timing controller. For example, the timing controller processes each frame of image data to generate a data signal and a control signal corresponding to each frame of the image data; then, the data signal is transmitted to the plurality of source drive chips connected in parallel, and each of the plurality of source drive chips converts the received data signal into a data voltage, so as to be written into a corresponding pixel on the display panel.

SUMMARY

Embodiments of the present disclosure provide a data transmission method and device, a display screen, and a display device. The technical solutions are as follows:

According to a first aspect of embodiments of the present disclosure, a data transmission method is provided. The method is applicable to a first drive chip in a display device that includes a controller, a plurality of drive chips and a data acquisition apparatus, the first drive chip being one of the plurality of drive chips and being connected to the controller and the data acquisition apparatus, respectively. The method includes:

receiving component-related data acquired by the data acquisition apparatus; and sending backhaul data to the controller, the backhaul data including the component-related data.

Optionally, the controller is connected to the first drive chip by a first differential signal line; and sending the backhaul data to the controller includes:

sending the backhaul data to the controller over the first differential signal line.

Optionally, the controller is connected to the first drive chip by a second differential signal line; and the method further includes:

receiving a control signal sent by the controller over the second differential signal line;

sending the backhaul data to the controller over the first differential signal line includes:

sending the backhaul data to the controller in real time over the first differential signal line.

Optionally, signals transmitted over the first differential signal line are transmitted in a form of data packets, each of the data packets includes a start bit, a data bit and a stop bit that are arranged in sequence;

wherein the start bit is intended to indicate start of data transmission, the data bit is intended to carry data to be transmitted, and the stop bit is intended to indicate stop of the data transmission.

Optionally, each of the data packets further includes: a setting mode bit and a pattern setting bit that are arranged in sequence between the start bit and the data bit, and a check bit between the data bit and the stop bit;

wherein the setting mode bit is intended to indicate a mode for setting a pattern of the data packet, the pattern setting bit is intended to indicate a pattern of the data packet, and the check bit is intended to perform data check, the pattern of the data packet including a require pattern or a response pattern.

Optionally, the data acquisition apparatus includes at least one of a camera component, an audio acquisition component, a display panel, a touch panel, and a sensor.

Optionally, in the case that the data acquisition apparatus includes the camera component, the component-related data includes image data;

in the case that the data acquisition apparatus includes the audio acquisition component, the component-related data includes voice data;

in the case that the data acquisition apparatus includes the display panel, the component-related data includes first indication information indicating whether operating state of the display panel is abnormal;

in the case that the data acquisition apparatus includes the sensor, the component-related data includes data collected by the sensor; and in the case that the data acquisition apparatus includes the touch panel, the component-related data includes touch data.

Optionally, the sensor includes at least one of a fingerprint sensor, a temperature sensor, a position sensor, an infrared sensor, and an ultrasonic sensor.

Optionally, the touch data includes at least one of touch position data and touch pressure data.

Optionally, the backhaul data further includes at least one of operating pattern data of the drive chip and second indication information indicating whether the operating state of the drive chip is abnormal.

Optionally, before sending the backhaul data to the controller, the method further includes:

performing analog-to-digital conversion on the component-related data in an analog signal form to acquire the component-related data in a digital signal form; and generating the backhaul data that includes the component-related data in the digital signal form.

Optionally, the drive chips are source drive chips; and the controller is any one of a timing controller, a system on chip (SOC), and a microcontroller unit (MCU) integrated in the timing controller.

According to a second aspect of embodiments of the present disclosure, a data transmission method is provided. The method is applicable to a controller in a display device that includes the controller, a plurality of drive chips and a data acquisition apparatus, the first drive chip being one of the plurality of drive chips and being connected to the controller and the data acquisition apparatus respectively. The method includes:

receiving backhaul data sent by the first drive chip, the backhaul data including component-related data;

wherein the backhaul data is sent to the controller by the first drive chip after receiving the component-related data acquired by the data acquisition apparatus.

Optionally, the controller is connected to the first drive chip by a first differential signal line; and receiving the backhaul data sent by the first drive chip includes:

receiving the backhaul data sent by the first drive chip over the first differential signal line.

Optionally, the controller is connected to the first drive chip by a second differential signal line; and the method further includes:

sending a control signal to the first drive chip over the second differential signal line;

receiving the backhaul data sent by the first drive chip over the first differential signal line includes:

receiving the backhaul data sent by the first drive chip in real time over the first differential signal line.

Optionally, signals transmitted over the first differential signal line are transmitted in a form of data packets, and each of the data packets includes a start bit, a data bit and a stop bit that are arranged in sequence;

wherein the start bit is intended to indicate start of data transmission, the data bit is intended to carry data to be transmitted, and the stop bit is intended to indicate stop of the data transmission.

Optionally, each of the data packets further includes: a setting mode bit and a pattern setting bit that are arranged in sequence between the start bit and the data bit, and a check bit between the data bit and the stop bit;

wherein the setting mode bit is intended to indicate a mode for setting a pattern of the data packet, the pattern setting bit is intended to indicate a pattern of the data packet, and the check bit is intended to perform data check, the pattern of the data packet including a require pattern or a response pattern.

Optionally, the data acquisition apparatus includes at least one of a camera component, an audio acquisition component, a display panel, a touch panel, and a sensor.

the drive chips are source drive chips; and the controller is any one of a timing controller, a system on chip (SOC), and a microcontroller unit (MCU) integrated in the timing controller.

According to a third aspect of embodiments of the present disclosure, a data transmission apparatus is provided. The method is applicable to a first drive chip in a display device that includes a controller, a plurality of drive chips and a data acquisition apparatus, the first drive chip being one of the plurality of drive chips and being connected to the controller and the data acquisition apparatus respectively. The apparatus includes:

a first receiving module configured to receive component-related data acquired by the data acquisition apparatus; and a sending module configured to send backhaul data to the controller, the backhaul data including the component-related data.

Optionally, the controller is connected to the first drive chip by a first differential signal line.

The sending module includes:

a sending sub-module configured to send the backhaul data to the controller over the first differential signal line.

Optionally, the controller is connected to the first drive chip by a second differential signal line. The apparatus further includes:

a second receiving module configured to receive a control signal sent by the controller over the second differential signal line.

The sending sub-module is configured to:

send the backhaul data to the controller in real time over the first differential signal line.

Optionally, the data acquisition apparatus includes at least one of a camera component, an audio acquisition component, a display panel, a touch panel, and a sensor.

Optionally, in the case that the data acquisition apparatus includes the camera component, the component-related data includes image data;

in case that the data acquisition apparatus includes the audio acquisition component, the component-related data includes voice data;

in the case that the data acquisition apparatus includes the display panel, the component-related data includes first indication information indicating whether operating state of the display panel is abnormal;

in the case that the data acquisition apparatus includes the sensor, the component-related data includes data collected by the sensor; and in the case that the data acquisition apparatus includes the touch panel, the component-related data includes touch data.

Optionally, the sensor includes at least one of a fingerprint sensor, a temperature sensor, a position sensor, an infrared sensor, and an ultrasonic sensor.

Optionally, the touch data includes at least one of touch position data and touch pressure data.

Optionally, the backhaul data further includes at least one of operating pattern data of the drive chip and second indication information indicating whether the operating state of the drive chip is abnormal.

Optionally, the apparatus further includes:

a converting module configured to perform analog-to-digital conversion on the component-related data in an analog signal form before sending the backhaul data to the controller, so as to acquire the component-related data in a digital signal form; and a generating module, configured to generate the backhaul data that includes the component-related data in the digital signal form.

Optionally, the drive chips are source drive chips.

The controller is any one of a timing controller, a system on chip (SOC), and a microcontroller unit (MCU) integrated in the timing controller.

According to a fourth aspect of embodiments of the present disclosure, a data transmission apparatus is provided and applicable to a controller in a display device that includes the controller, a plurality of drive chips and a data acquisition apparatus, the first drive chip being one of the plurality of drive chips and being connected to the controller and the data acquisition apparatus respectively, and the apparatus includes:

a receiving module, configured to receive backhaul data sent by the first drive chip, the backhaul data including component-related data;

wherein the backhaul data is sent to the controller by the first drive chip after receiving the component-related data acquired by the data acquisition apparatus.

Optionally, the controller is connected to the first drive chip by a first differential signal line.

The receiving module includes:

a receiving sub-module configured to receive the backhaul data sent by the first drive chip over the first differential signal line.

Optionally, the controller is connected to the first drive chip by a second differential signal line. The apparatus further includes:

a sending module, configured to send a control signal to the first drive chip over the second differential signal line.

The receiving sub-module is configured to:

receive the backhaul data sent by the first drive chip over the first differential signal line in real time.

Optionally, signals transmitted over the first differential signal line are transmitted in a form of data packets, and each of the data packets includes a start bit, a data bit and a stop bit that are arranged in sequence;

wherein the start bit is intended to indicate start of data transmission, the data bit is intended to carry data to be transmitted, and the stop bit is intended to indicate stop of the data transmission.

Optionally, each of the data packets further includes: a setting mode bit and a pattern setting bit that are arranged in sequence between the start bit and the data bit, and a check bit between the data bit and the stop bit;

wherein the setting mode bit is intended to indicate a mode for setting a pattern of the data packet, the pattern setting bit is intended to indicate a pattern of the data packet, and the check bit is intended to perform data check, the pattern of the data packet including a require pattern or a response pattern.

Optionally, the data acquisition apparatus includes at least one of a camera component, an audio acquisition component, a display panel, a touch panel, and a sensor;

the drive chip are source drive chips; and the controller is any one of a timing controller, a system on chip (SOC), and a microcontroller unit (MCU) integrated in the timing controller.

According to a fifth aspect of embodiments of the present disclosure, a data transmission device is provided, the device is applicable to a first drive chip in a display device that includes a controller, a plurality of drive chips and a data acquisition apparatus, the first drive chip being one of the plurality of drive chips and being connected to the controller and the data acquisition apparatus respectively, and the device includes:

a processor;

a memory, configured to store at least one executable instruction of the processor; wherein the processor is configured to perform the data transmission method according to any one of the first aspect when the at least one executable instruction is executed by the processor.

According to a sixth aspect of embodiments of the present disclosure, a data transmission device is provided. The device is applicable to a controller in a display device that includes the controller, a plurality of drive chips and a data acquisition apparatus, the first drive chip being one of the plurality of drive chips and being connected to the controller and the data acquisition apparatus respectively. The device includes:

a processor;

a memory, configured to store at least one executable instruction of the processor; wherein the processor is configured to perform the data transmission method according to any one of the second aspect when the at least one executable instruction is executed by the processor.

According to a seventh aspect of embodiments of the present disclosure, a display screen is provided. The display screen includes: a display panel and a panel drive circuit, wherein the panel drive circuit includes a controller and a plurality of drive chips, the plurality of drive chips including a first drive chip; and the controller includes the data transmission apparatus according to the third aspect, and the first drive chip includes the data transmission apparatus according to the fourth aspect; alternatively, the controller includes the data transmission device according to the sixth aspect, and the first drive chip includes the data transmission device according to the fifth aspect.

Optionally, the controller is connected to the first drive chip by a first differential signal line, and the first differential signal line is configured to transmit backhaul data sent by the first drive chip to the controller in real time; and the controller is connected to the plurality of drive chips by second differential signal lines, respectively, and each of the second differential signal lines is configured to transmit a control signal sent by the controller to a corresponding drive chip.

According to an eighth aspect of embodiments of the present disclosure, a display device is provided. The display device includes: a display screen according to any one of the seventh aspect, and further includes: a data acquisition apparatus that is connected to the first drive chip and configured to acquire and send component-related data to the first drive chip.

According to a ninth aspect of embodiments of the present disclosure, a computer-readable storage medium storing instructions therein, wherein when running on a processing component, the computer-readable storage medium causes the processing component to execute the data transmission method according to any one of the first aspect or causes the processing component to execute the data transmission method according to any one of the second aspect.

According to a tenth aspect of embodiments of the present disclosure, a computer program product storing instructions therein is provided. When running on a computer, the computer program product causes the computer to execute the data transmission method according to any one of the first aspect or causes the computer to execute the data transmission method according to any one of the second aspect.

According to an eleventh aspect of embodiments of the present disclosure, a chip is provided, wherein the chip includes a programmable logic circuit and/or program instruction, and when the chip operates, the chip is configured to perform the data transmission method according to any one of the first aspect or perform the data transmission method according to any one of the second aspect.

It is to be understood that both the foregoing general description and the following detailed description are exemplary only and are not intended to limit the present disclosure.

BRIEF DESCRIPTION OF THE DRAWINGS

In order to describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may also derive other drawings from these accompanying drawings without creative efforts.

The accompanying drawings, which are incorporated in and constitute a part of this specification, illustrate embodiments consistent with the present disclosure, and together with the description, serve to explain the principles of the present disclosure.

DETAILED DESCRIPTION

For clearer descriptions of the principles in the embodiments of the present disclosure, the present disclosure is described in detail below in combination with the accompanying drawings. Apparently, the described embodiments are merely some embodiments, rather than all embodiments, of the present disclosure. Based on the embodiments of the present disclosure, all other embodiments derived by a person of ordinary skill in the art without creative efforts shall fall within the protection scope of the present disclosure.

In current display devices, the drive chip is only capable of performing operations of voltage data writing or the like under the control of a controller, such as a timing controller. The data transmission between the controller and the drive chip is usually one-way, i.e., from the controller to the drive chip, and the drive chip is only capable of performing operations of data receiving and writing. Thus, the function of the drive chip is relatively single.

Figure 1:
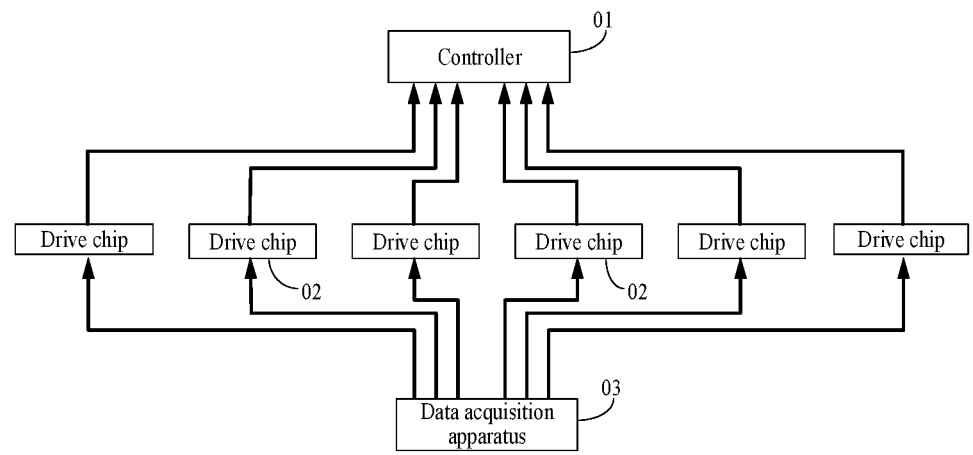
FIG. 1 is a schematic diagram of an application environment of a data transmission method according to an embodiment of the present disclosure.

Referring to FIG. 1 that is a schematic diagram of an application environment of a data transmission method according to an embodiment of the present disclosure. As shown in FIG. 1, the data transmission method is applied in the display device. The display device includes a controller 01, a plurality of drive chips 02 and a data acquisition apparatus 03. All of the plurality of drive chips 02 are connected to the controller 01, and at least one drive chip 02 of the plurality of drive chips 02, which has a function of transmitting the backhaul data, is connected to the data acquisition apparatus 03. FIG. 1 gives an illustration by taking an example that the plurality of drive chips 02 all have a function of transmitting the backhaul data and are all connected to the data acquisition apparatus 03, which however does not limit the chip having the function of transmitting the backhaul data. The backhaul data refers to data transmitted by the data acquisition apparatus to the drive chip.

Figure 2:
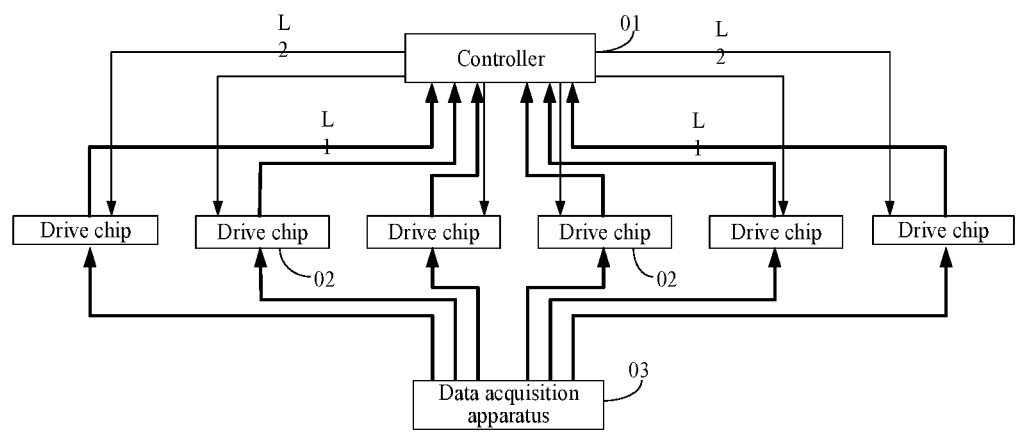
FIG. 2 is a schematic diagram of an application environment of another data transmission method according to an embodiment of the present disclosure.

Furthermore, in the embodiment of the present disclosure, the controller 01 may control the drive chip 02 by a control signal. On this basis, the data transmission method according to the embodiment of the present disclosure may perform backhaul of the component-related data over the backhaul data. The component-related data is acquired by the data acquisition apparatus and is data related to data acquisition apparatus, which may include data for reflecting operating state of the data acquisition apparatus and may further include data collected or received by the data acquisition apparatus. In order to ensure effective transmission of the control signal and the component-related data, as shown in FIG. 2, the controller 01 may be connected to each of the at least one drive chip 02 by a first signal line L1 (that is, a signal line with an arrow facing the controller in FIG. 2) and a second signal line L2 (that is, a signal line with an arrow facing the drive chip in FIG. 2). Each of the at least one drive chip 02 may send the backhaul data to the controller 01 over the first signal line L1, and the controller 01 may send the control signal to each of the at least one drive chip 02 over the second signal line L2. In this way, conflicts between the two signal lines in timing of the data transmission can be avoided, and real-time data transmission can be achieved. FIG. 2 makes an illustration by taking an example that the plurality of drive chips 02 are all connected to the controller 01 by the first signal line L1 and the second signal line L2, which however does not limit the signal line between the drive chip and the controller.

Figure 3:
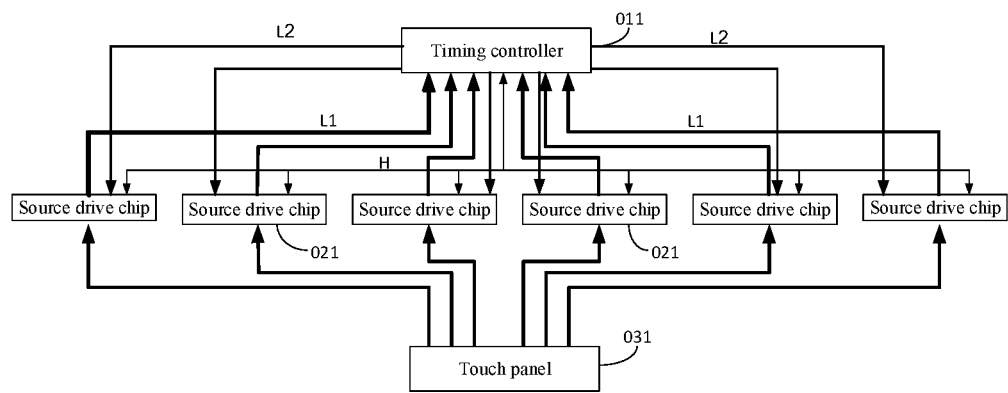
FIG. 3 is a schematic diagram of an application environment of still another data transmission method according to an embodiment of the present disclosure.

The aforementioned data acquisition apparatus may include at least one of a camera component, an audio acquisition component, a display panel, a touch panel, and a sensor. The embodiment of the present disclosure does not limit the number of the display panel, the touch panel, and the sensor. The aforementioned drive chip may be a source drive chip or a gate drive chip. The controller may be any one of a timing controller, a system on chip (SOC) and a microcontroller unit (MCU) integrated in the timing controller. FIG. 3 makes an illustration by taking an example that the controller is a timing controller 011, the drive chip is a source drive chip 021, and the data acquisition apparatus is a touch panel 031. As shown in FIG. 3, the timing controller 011 are correspondingly connected to the plurality of source drive chips 021 one by one by a plurality of second signal lines L2 (that is, the signal lines with arrows facing the source drive chip in FIG. 3), and are further correspondingly connected to the chips that have the function of transmitting the backhaul data (that is, being capable of performing backhaul data transmission) among the plurality of source drive chips 021 one by one by at least one first signal line L1 (that is, the signal line with an arrow facing the timing controller in FIG. 3). Optionally, the timing controller 011 is further connected with a third signal line (that is, the signal line with a bidirectional arrow in FIG. 3). The third signal line H is usually one, which may be, for example, a wiring on a printed circuit board (PCB). The plurality of source drive chips 021 is connected in parallel and connected with the third signal line H. The third signal line H may be used to identify a level state, for example, a pin of the source drive chip may be set to a high level or a low level by the third signal line. In FIG. 3, it is assumed that the plurality of source drive chips 021 is connected in parallel and connected to the timing controller 011 by the first signal line, the second signal line, and the third signal line, and the plurality of source drive chips 021 are all connected to the touch panel 031.

The first signal line and the second signal line may be high-speed signal lines, and the third signal line may be a low-speed signal line. That is, the first signal line and the second signal line both have a greater transmission rate than the third signal line. For example, the first signal line and the second signal line may be differential signal lines, and the third signal line may be an ordinary signal line, such as, a metal line that transmits electrical signals or a wiring on the PCB, as long as the signal transmission is ensured. In the embodiment of the present disclosure, each of the signal lines performs the data transmission by a peer-to-peer (P2P) protocol. The P2P technology refers to a technology that a receiver and a transmitter of the signal transmission are directly connected for transmitting signal without passing through a relay device.

During the implementation of the present disclosure, if there are a plurality of drive chips having the function of transmitting the backhaul data, these plurality of drive chips may be connected to different data acquisition apparatuses respectively. For example, some of the drive chips are connected to the display panel, and the other drive chips are connected to the touch panel; alternatively, some of the chips are connected to a sensor, and the other chips are connected to another sensor. It should be noted that, in the embodiment of the present disclosure, a drive chip may be connected to one or more data acquisition apparatuses, and a data acquisition apparatus may also be connected to one or more drive chips.

Figure 4:
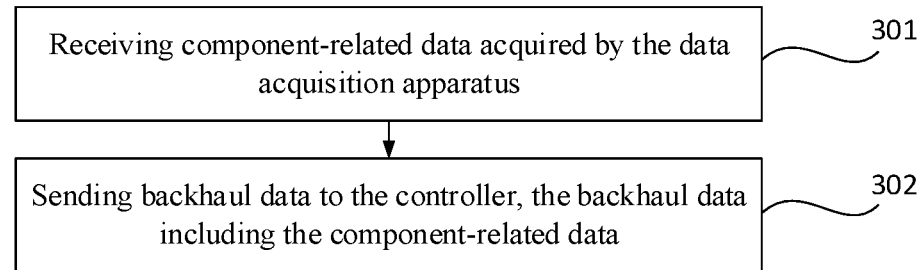
FIG. 4 is a flowchart of a data transmission method according to an exemplary embodiment.

An embodiment of the present disclosure provides a data transmission method as shown in FIG. 4. The method is applicable to the first drive chip of the display device shown in any one of FIGS. 1 to 3. The display device includes a controller, a plurality of drive chips, and a data acquisition apparatus, and the first drive chip is one of the plurality of drive chips. Exemplarily, the first drive chip may be any one of the plurality of drive chips, or may be a specified one of the plurality of drive chips, which is not limited in the embodiment of the present disclosure. The first drive chip is connected to the controller and the data acquisition apparatus respectively. The method includes following steps.

In step 301, component-related data acquired by the data acquisition apparatus is received.

In step 302, backhaul data is sent to the controller, and the backhaul data includes the component-related data.

In summary, in the data transmission method according to the embodiment of the present disclosure, the first drive chip can receive the component-related data acquired by the data acquisition apparatus and transmit the component-related data to the controller over the backhaul data. In this way, bidirectional data transmission between the controller and the drive chip is achieved, thereby enriching functions of the drive chip and improving utilization rate of the drive chip.

Figure 5:
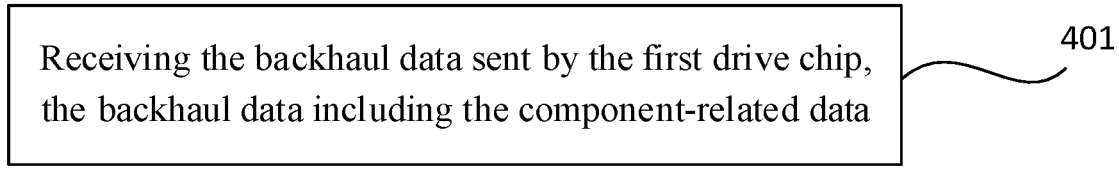
FIG. 5 is a flowchart of another data transmission method according to an exemplary embodiment.

This embodiment of the present disclosure provides a data transmission method as shown in FIG. 5. The method is applicable to the controller of the display device shown in any one of FIGS. 1 to 3. The display device includes a controller, a plurality of drive chips, and a data acquisition apparatus, and the first drive chip is one of the plurality of drive chips and connected the controller and the data acquisition apparatus respectively. Exemplarily, the first drive chip may be any one of the plurality of drive chips, or may be a specified one of the plurality of drive chips, which is not limited in the embodiment of the present disclosure. The method includes following steps.

In step 401, backhaul data sent by the first drive chip is received, and the backhaul data includes component-related data.

The backhaul data is sent to the controller by the first drive chip after receiving the component-related data acquired by the data acquisition apparatus, and the component-related data is configured to reflect the operating state of the data acquisition apparatus.

In summary, in the data transmission method according to the embodiment of the present disclosure, the first drive chip can receive the component-related data acquired by the data acquisition apparatus and transmit the component-related data to the controller over the backhaul data, which enriches functions of the drive chip and improves utilization rate of the drive chip.

Figure 6:
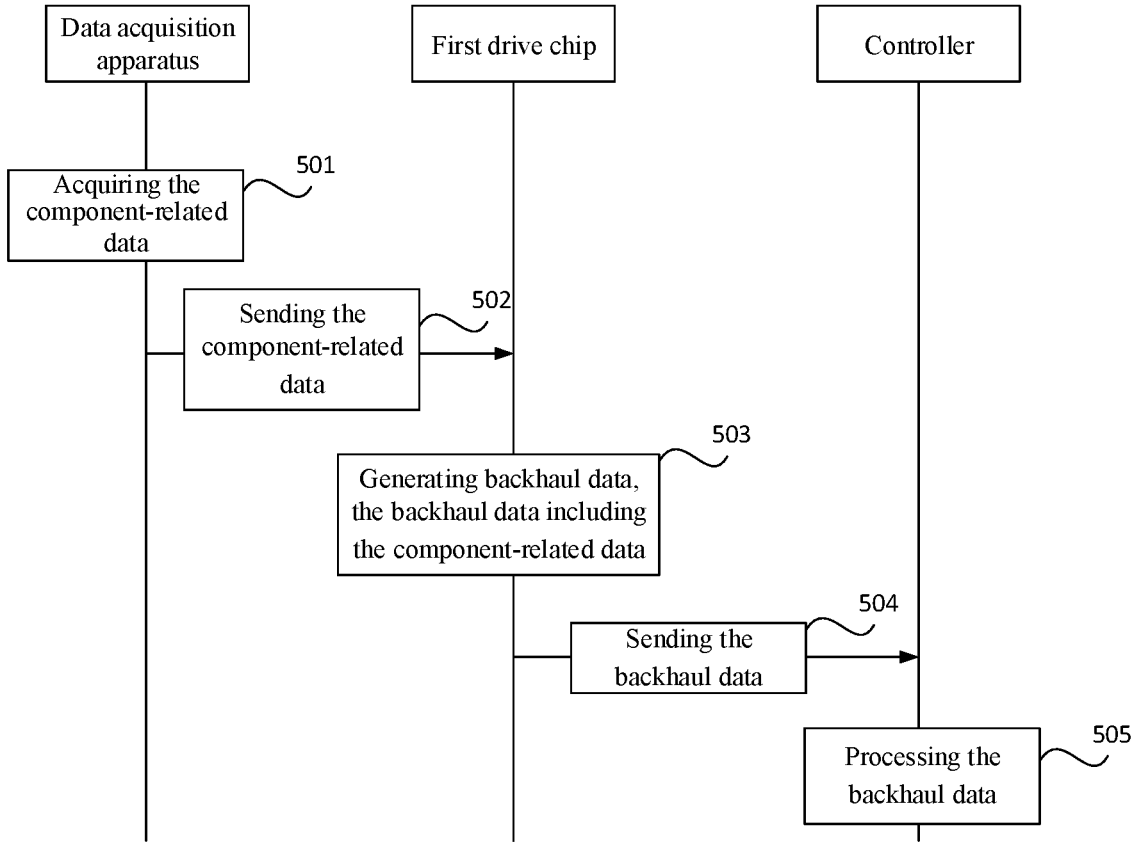
FIG. 6 is a flow chart of still another data transmission method according to an exemplary embodiment.

This embodiment of the present disclosure provides a data transmission method as shown in FIG. 6. The method is applicable to the display device shown in any one of FIGS. 1 to 3. The display device includes a controller, a plurality of drive chips, and a data acquisition apparatus, and a first drive chip is one of the plurality of drive chips and is connected the controller and the data acquisition apparatus respectively. The method includes following steps.

In step 501, the data acquisition apparatus acquires component-related data.

In the embodiment of the present disclosure, the data acquisition apparatus may include at least one of a display panel, a touch panel, and a sensor. Obviously, the data acquisition apparatus may also include other components for acquiring data in the display device, such as a camera component or an audio acquisition component. The camera component may include at least one of a front camera and a rear camera, and the audio acquisition component may be a microphone or the like, which is not limited in the embodiment of the present disclosure.

The component-related data may include data for reflecting the operating state of the data acquisition apparatus and may further include data collected or received by the data acquisition apparatus. Since the driver is generally provided on the display panel or connected to the display panel by a PCB or the like, the data acquisition apparatus may be integrated in the display panel, or embedded within the display panel, or provided on the display panel, or disposed near the display panel, such that the connection line between the driver and the data acquisition apparatus is comparatively short, thereby achieving rapid transmission of the backhaul data. In the embodiment of the present disclosure, different types of data acquisition apparatuses correspond to different component-related data. The embodiment of the present disclosure is illustrated by taking following types of data acquisition apparatuses as examples.

First, in the case that the data acquisition apparatus includes the display panel, the component-related data may include first indication information for indicating whether the operating state of the display panel is abnormal. The first indication information includes normal indication information for indicating that the operating state of the display panel is normal, and abnormal indication information for indicating that the operating state of the display panel is abnormal. The first indication information may be represented by a preset character. For example, 0 represents the normal indication information, and 1 represents the abnormal indication information.

Second, in the case that the data acquisition apparatus includes the sensor, the component-related data may include data collected by the sensor.

Exemplarily, the sensor includes at least one of a fingerprint sensor, a temperature sensor, a position sensor, an infrared sensor, and an ultrasonic sensor. If the senor includes the fingerprint sensor, the data collected by the sensor may include fingerprint data, and the fingerprint sensor may be provided under the display panel or embedded within the display panel. If the senor includes the temperature sensor, the data collected by the sensor may include temperature data, and the temperature sensor may be provided on a casing of the display device. If the senor includes the position sensor, the data collected by the sensor may include position data. The position sensor may be provided on a casing of the display device, and configured to measure position of the display device per se. For example, the position sensor may include a linear displacement sensor and/or an angular displacement sensor. If the sensor includes the infrared sensor, the data collected by the sensor may include infrared data. The infrared sensor may be provided under the display panel and configured to assist in some detection functions, such as detecting whether a human body is close to the display device. If the display device includes the camera, the infrared sensor may also be integrated in the camera to assist in some image processing functions, such as detecting whether a human body is present in the captured image by means of infrared imaging. If the senor includes the ultrasonic sensor, the data collected by the sensor may include ultrasonic data. The ultrasonic sensor may be provided on a casing of the display device and configured to measure the distance from an object outside the display device to the display device.

Third, in the case that the data acquisition apparatus includes the touch panel, the component-related data may include touch data. The touch data includes at least one of touch position data and touch pressure data. The touch position data is configured to characterize position of the touch point, and for example, the touch position data may be a coordinate value. The touch pressure data is configured to characterize pressure detected at the touch point, and for example, the touch pressure data may be a pressure value.

Fourth, in the case that the data acquisition apparatus includes the camera component, the component-related data may include image data. The image data can be captured or scanned by the camera component.

Fifth, in the case that the data acquisition apparatus includes the audio acquisition component, the component-related data may include voice data.

The aforesaid five types of data acquisition apparatuses and corresponding component-related data are only illustrative, which are not limited in the embodiment of the present disclosure.

In step 502, the data acquisition apparatus sends the component-related data to the first drive chip.

In the embodiment of the present disclosure, the first drive chip may be connected to the data acquisition apparatus in a specified mode, and the data acquisition apparatus may send the component-related data to the first drive chip over the connection. The connection may be, for example, a circuit connection, a data line connection, or a flexible circuit board (FPC) connection, which is not limited in the embodiment of the present disclosure.

In step 503, the first drive chip generates backhaul data, and the backhaul data includes the component-related data.

After receiving the component-related data acquired by the data acquisition apparatus, the first drive chip may generate the backhaul data based on the component-related data. In the embodiment of the present disclosure, the component-related data may have a plurality of forms, and the first drive chip may perform different processing modes with respect to different forms of the component-related data. The embodiment of the present disclosure is illustrated by taking following two forms of component-related data as examples.

For the first form, the component-related data may be raw data, also called original data. That is, in the step 502, after acquiring the component-related data, the data acquisition apparatus directly sends the component-related data to the first drive chip without performing any processing. Obviously, the data shall be sent in a format agreed with the first drive chip.

The component-related data that is not processed is generally in an analog signal form. The first drive chip may directly send the component-related data, as the backhaul data, to the controller, or may process the component-related data to generate the backhaul data, and further send the backhaul data to the controller. The processing process may include that the first drive chip performs analog-to-digital conversion on the component-related data in the analog signal form to acquire the component-related data in a digital signal form; and then, the backhaul data, which includes the component-related data in the digital signal form, is generated. The aforesaid process of performing analog-to-digital conversion on the component-related data in the analog signal form may be implemented by an analog-to-digital converter (ADC) integrated in the first drive chip. As the first drive chip may perform the analog-to-digital conversion, the function can be further enriched, thereby improving the utilization rate.

For the second form, the component-related data may be processed data. That is, in the step 502, after acquiring the component-related data, the data acquisition apparatus processes the component-related data and sends the processed component-related data to the first drive chip. Obviously, the data shall be sent in a format agreed with the first drive chip.

The processed component-related data is generally in the digital signal form. The first drive chip may directly send the component-related data, as the backhaul data, to the controller.

Furthermore, in addition to the component-related data, the backhaul data may further include information of the drive chip. In this way, the first drive chip may achieve backhaul of the information of the drive chip, thereby further enriching functions of the drive chip.

For example, the backhaul data includes at least one of the operating pattern data of the drive chip and the second indication information indicating whether the operating state of the drive chip is abnormal. The information of the drive chip may also include other information, such as, data processing rate of the drive chip and so on.

The operating pattern data is configured to indicate an operating pattern of the drive chip, and the operating pattern is configured to reflect a current data processing rate of the drive chip. For example, the operating pattern includes a low-speed operating pattern or a high-speed operating pattern, and the high-speed operating pattern has a greater data processing rate than the low-speed operating pattern. The first drive chip may dynamically switch the operating patterns according to the specific application scenario. Optionally, the first drive chip may determine its operating pattern according to the data volume to be processed currently. For example, m processing modules are provided on the first drive chip, and the data volume to be processed currently requires n processing modules. If the number of n is greater than a preset number threshold, it is determined that the first drive chip is in the high-speed operating pattern. If the number of n is not greater than the preset number threshold, it is determined that the first drive chip is in the low-speed operating pattern. Alternatively, when n/m is greater than a preset ratio threshold, it is determined that the first drive chip is in the high-speed operating pattern; and when n/m is not greater than the preset ratio threshold, it is determined that the first drive chip is in the low-speed operating pattern, where m is a positive integer greater than 1. The aforesaid processing module may be a processor or a processing chip. In the case that the processing module is the processing chip, the m processing chips may include at least one of an analog-to-digital conversion chip, a computation chip, and a storage chip.

The second indication information includes normal indication information for indicating that the operating state of the drive chip is normal and abnormal indication information for indicating that the operating state of the drive chip is abnormal. The second indication information may be represented by a preset character. For example, 0 represents the normal indication information, and 1 represents the abnormal indication information.

It should be noted that the aforementioned backhaul data may further include a flag bit of the drive chip, which is configured to identify the drive chip, such that the controller can determine the sending end of the backhaul data after receiving the backhaul data.

In step 504, the first drive chip sends the backhaul data to the controller.

In the embodiment of the present disclosure, the controller is connected to the first drive chip in a communication mode. As shown in any one of FIGS. 1-3, the controller may be connected to the first drive chip by the first signal line, or by the second signal line, or by the third signal line. The control signals may be generally transmitted over the second signal line, such that the first drive chip can be controlled rapidly and efficiently. Exemplarily, the second signal line is a high-speed signal line, such as the aforesaid second differential signal line.

The first drive chip may send the backhaul data to the controller over the aforesaid first signal line. The first signal line may be a single bus, which is encoded by Manchester, or may be double line, such as a serial peripheral interface (SPI) bus or an I2C bus. The signal transmission rate of the single bus is usually 100 kHz (kilohertz), the transmission rate of the SPI bus may reach 16 MHz, and the transmission rate of the I2C bus may reach 400 kHz. The transmission rates of the three types of signal lines are all low, and consequently the transmission of large data volume cannot be achieved. As the three types of signal lines are used to transmit the large volume data or used to acquire the data in real-time, packet loss is prone to occur. In the embodiment of the present disclosure, the first signal line may be the high-speed signal line, such as the first differential signal line. The differential signal line can not only realize the rapid and real-time backhaul of the data, but also support the transmission of large volume data. Especially in the case that the data volume of the component-related data is large, a better transmission effect can be achieved, thereby ensuring that the controller can make a respond and control in time. For example, when the component-related data is the touch data of the touch panel, the first differential signal line may rapidly transmit the complete touch data to the controller, and the controller may respond rapidly to the touch data. When the component-related data is the temperature data collected by the temperature sensor, the first differential signal line may rapidly transmit the complete temperature data to the controller, and the controller may perform a rapid processing based on the temperature data. For example, when the temperature is high (that is, when the temperature is greater than the temperature threshold), the temperature decreasing process is performed.

Furthermore, when the first drive chip is connected to the controller by the first differential signal line and the second differential signal line simultaneously, the first drive chip may receive the control signal sent by the controller over the second differential signal line and perform the operation indicated by the control signal. At the same point, the first driver chip may send the backhaul data to the controller in real time over the first differential signal line. In this way, since two differential signal lines are provided between the first drive chip and the controller, the signal transmission and the signal reception are independent from each other and thereby do not affect each other. Thus, there will be no conflict in timing, and real-time transmission of the backhaul data can be achieved. That is, after acquiring the component-related data each time, the data acquisition apparatus directly transmits the component-related data to the first drive chip. After generating the backhaul data based on the component-related data, the first drive chip directly transmits the backhaul data to the controller over the first differential signal line. In this way, the timeliness of the component-related data can be guaranteed, and the controller can timely acquire the component-related data and thereby timely and rapidly process the component-related data.

The differential signal line includes two signal lines and performs signal transmission by means of differential transmission. As a signal transmission technology, the differential transmission, which is different from the traditional method with one signal line (the signal line may be a clock signal line, also known as CLK line) and one ground line, may transmit signals over the two signal lines. The signals transmitted over the two signal lines have same amplitude and opposite phases, and the signals transmitted over the two signal lines are differential signals. During normal operation, the two signal lines are loaded with opposite levels, and the signals as loaded are Vo+ and Vo−, respectively. Exemplarily, if the difference between the two signals is positive, the corresponding transmitted signal is a binary number 1, and if the difference is negative, the corresponding transmitted signal is a binary number 0. The difference between the signals on the two signal lines may characterize the specific transmitted signal. In traditional panel drive circuits, additional signal lines (such as the aforesaid clock signal lines) are required to identify the clock state. Whereas, by adopting the differential signal line, the clock signal may be encoded into the signal transmitted by the differential signal line, which is a mode called the clock embedded mode. Thus, compared with the traditional transmission mode, the method for transmitting signals via over differential signal lines has following advantages: saving resources without using extra signal lines and ground lines; high accuracy so as to easily identifying small signals; strong anti-electro magnetic interference (EMI) ability; and high signal transmission rate, thereby having a wide application prospect.

Figure 7:
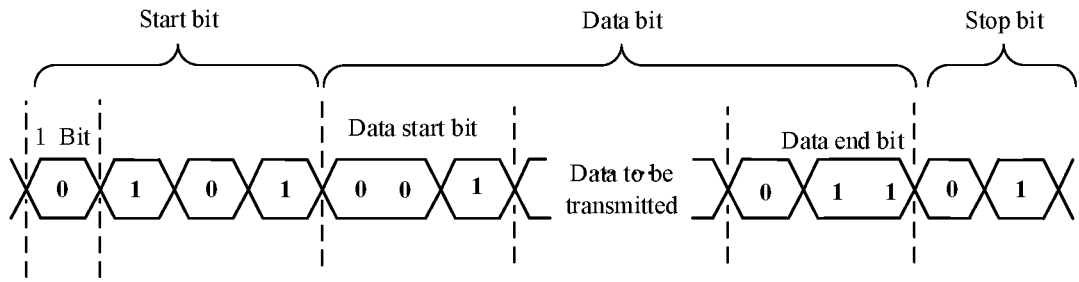
FIG. 7 is a schematic structural diagram of a data packet transmitted over a first differential signal line according to an exemplary embodiment.

Signals transmitted over the first differential signal line are transmitted in a form of data packets. As shown in FIG. 7, that is a schematic structural diagram of a data packet transmitted over the first differential signal line, the structure of other data packets on the first differential signal line may also refer to the aforesaid data packet. The data packet may include a start bit, a data bit, and a stop bit that are arranged in sequence. The start bit is configured to indicate start of data transmission and may include a start identifier; the data bit is configured to carry the data to be transmitted; and the stop bit is configured to indicate stop of the data transmission and may include a stop identifier. It can be seen from FIG. 7 that the start bit, data bit, and stop bit are all represented by a difference value of 0 or 1, and each difference value occupies 1 bit. The data bit may include a data start bit, data to be transmitted, and a data end bit (also known as a data stop bit). The data start bit is intended to indicate the actual start position of the data to be transmitted, and the data end bit is intended to indicate the actual end position of the data to be transmitted. Furthermore, the data bit may further include a data check bit (not shown in FIG. 7), which is intended to perform data check of the data to be transmitted to improve the reliability of data transmission.

Figure 8:
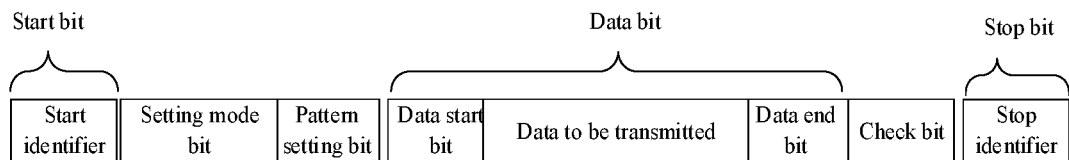
FIG. 8 is a schematic structural diagram of another data packet transmitted over a first differential signal line according to an exemplary embodiment.

Optionally, as shown in FIG. 8, each of the data packets further includes: a setting mode bit and a pattern setting bit that are sequentially arranged between the start bit and the data bit, and a check bit between the data bit and the stop bit.

The setting mode bit includes modes for setting a pattern of the data packet, such as a software setting mode indicative of pattern setting by signaling transmission or a hardware setting mode indicative of pattern setting by rai sing or lowering the chip pins. Furthermore, the setting mode bit may further include some parameters that reflect the pattern setting of the data packet, such as setting parameters for setup, setting parameters during transmission, or setting parameters at the end of transmission. The pattern setting bit is intended to indicate the pattern of the data packet, and the pattern of the data packet may include a require (ask) pattern or a response pattern. The check bit is intended to perform data check. It should be noted that the data check bit and check bit can both perform data checking functions, and the difference therebetween lies in that positions of them in the data packet are different.

In an optional implementation, the controller may transmit both control signals and backhaul data over a bidirectional signal line. For example, the bidirectional signal line is the third signal line described above, and the control signal and the backhaul data shall be transmitted in a time-division manner on the bidirectional signal line.

In step 505, the controller processes the backhaul data.

It can be seen from the step 503 that the backhaul data may include the component-related data, and may also include information of the drive chip. After receiving the backhaul data sent by the first drive chip, the controller may perform corresponding processing, such as forwarding, responding, or storing of the data, with respect to different data contents in the backhaul data.

In the embodiment of the present disclosure, the following data contents are taken as examples to describe the corresponding processing actions.

First, the backhaul data includes the component-related data, and the component-related data includes first indication information for indicating whether operating state of the display panel is abnormal. If the first indication information indicates that the operating state of the display panel is abnormal, that is, the first indication information is the abnormal indication information, the controller may issue an alarm message or forward the first indication information to a specified processor, such as a central processing unit (CPU). If the controller is the timing controller, the timing controller may be externally connected to the MCU, and the timing controller may forward the first indication information to the MCU, such that the MCU may process the first indication information and thereof share the load of the controller.

Second, the backhaul data includes the component-related data, and the component-related data includes the data collected by the sensor. The controller may store the data collected by the sensor in the memory, or forward the data collected by the sensor to the specified processor, such as the CPU. If the controller is the timing controller, the timing controller may be externally connected to the MCU, and the timing controller may forward the data collected by the sensor to the MCU, such that the MCU may process the data collected by the sensor and thereof share the load of the controller.

Third, the backhaul data includes the component-related data, and the component-related data includes the touch data. The controller may store the touch data in the memory, or respond to the touch data, or forward the touch data to the specified processor, such as the CPU. If the controller is the timing controller, the timing controller may be externally connected to the MCU, and the timing controller may forward the touch data to the MCU, such that the MCU may process the touch data and thereof share the load of the controller.

Fourth, the backhaul data includes the component-related data, and the component-related data includes the image data. The controller may respond to the image data (that is, to control the display panel to display the image corresponding to the image data), or forward the image data to the specified processor, such as the CPU if the controller is the timing controller, the timing controller may be externally connected to the MCU, and the timing controller may forward the image data to the MCU, such that the MCU may process the image data and thereof share the load of the controller.

Fifth, the backhaul data includes the component-related data, and the component-related data includes the voice data. The controller may forward the voice data to the specified component, such as a voice player, or forward the voice data to the specified processor, such as the CPU. If the controller is the timing controller, the timing controller may be externally connected to the MCU, and the timing controller may forward the voice data to the MCU, such that the MCU may process the voice data and thereof share the load of the controller.

Sixth, the backhaul data includes information of the drive chip, and information of the drive chip includes the operating pattern data of the drive chip. The controller may store the operating pattern data.

Seventh, the backhaul data includes information of the drive chip, and the information of the drive chip includes second indication information indicating whether the operating state of the drive chip is abnormal. If the second indication information indicates that the operating state of the display panel is abnormal, that is, the second indication information is the abnormal indication information, the controller may issue an alarm message or forward the second indication information to the specified processor, such as the CPU. If the controller is the timing controller, the timing controller may be externally connected to the MCU and forward the second indication information to the MCU, such that the MCU may process the second indication information and thereof share the load of the controller.

It should be noted that, after the MCU acquires the data, the mode for processing the data may refer to the processing mode of the controller, which is not repeated in the embodiment of the present disclosure.

Since the backhaul data may include a variety of data contents, the controller may perform one or more of the aforesaid seven processing actions based on different data contents, which is not limited in the embodiment of the present disclosure. Further, the processor may also generate a corresponding control signal based on the data content in the backhaul data, and send the control signal to the first drive chip so as to control the first drive chip. For example, when the component-related data includes the image data, the controller may include the control signal of the image data, and send the control signal to the first drive chip, such that the driving display panel of the first drive chip displays the image corresponding to the image data.

It should be noted that the controller, on basis of the traditional controller, may provide with a specified processing module to receive the backhaul data transmitted by the first drive chip and further send a control signal or a response signal with respect to the backhaul data to the first drive chip by the processing module. Obviously, the processing module may further send other data, such as configuration data or the like, to the first drive chip, which is not limited in the embodiment of the present disclosure. In an optional implementation, the processing module may send the data to the first drive chip over the first differential signal line. That is, the first differential signal line may perform bidirectional data transmission. In another optional implementation, the processing module may send the data to the first drive chip over the additional third differential signal line. That is, the third differential signal line and the first differential signal line perform unidirectional data transmission respectively, which is not limited in the embodiment of the present disclosure. Exemplarily, the processing module may be a processor or a processing chip.

Furthermore, under the control of the controller, the first drive chip may send a signal, such as a data acquiring request, to the data acquisition apparatus. Thus, the bidirectional connection may also be established between the first drive chip and the data acquisition apparatus. The bidirectional connection may be implemented by a circuit connection, data line connection, or FPC connection that supports bidirectional communication, or implemented by two connections which support unidirectional communication, with the connection being a circuit connection, data line connection, or FPC connection.

Figure 9:
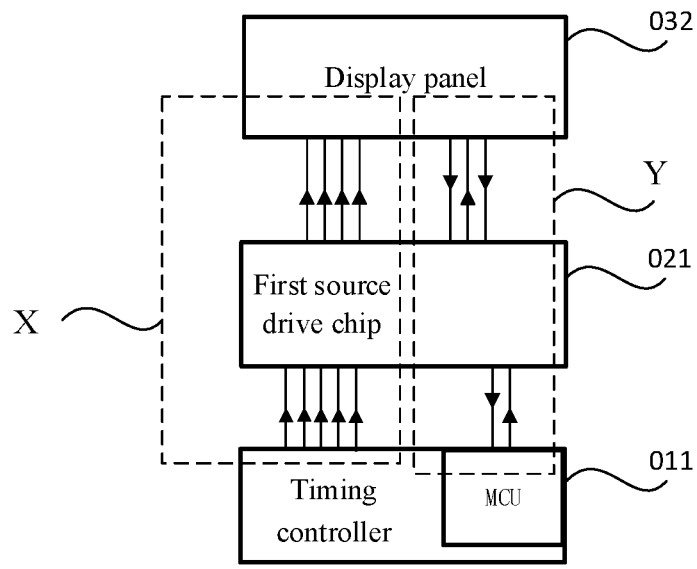
FIG. 9 is a schematic diagram of a connection relationship among a data acquisition apparatus, a first drive chip, and a controller according to an exemplary embodiment.

Refer to FIG. 9, that is a schematic diagram of a connection relationship among a data acquisition apparatus, a first drive chip, and a controller. In FIG. 9, it is assumed that the controller is a timing controller 011, the processing module is an MCU integrated in the controller, the first drive chip is a first source drive chip 021, and the data acquisition apparatus is a display panel 032. The connection in the area X is a connection required to achieve the basic display function of the display panel, and the connection in the area Y is a connection newly added in the embodiment of the present disclosure. The bidirectional data transmission may be performed between the source drive chip 021 and the display panel 032, and may also be performed between the source drive chip 021 and the timing controller 011. In this way, the real-time and efficient data transmission may be achieved especially when the connection is conducted over differential signal lines.

In summary, in the data transmission method according to the embodiment of the present disclosure, the first drive chip may receive the component-related data acquired by the data acquisition apparatus and transmit the component-related data to the controller over the backhaul data. In this way, bidirectional data transmission between the controller and the drive chip is achieved, thereby enriching functions of the drive chip and improving utilization rate of the drive chip. In addition, the backhaul of the data can be achieved efficiently by adopting the first differential signal line, which results in a high data transmission efficiency.

Figure 10:
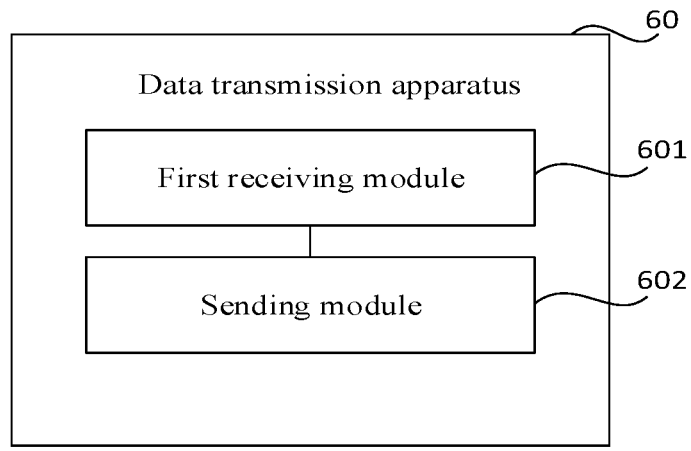
FIG. 10 is a block diagram of a data transmission apparatus according to an exemplary embodiment.

An embodiment of the present disclosure provides a data transmission apparatus 60, as shown in FIG. 10. The apparatus is applicable to a first drive chip in a display device including a controller, a plurality of drive chips and a data acquisition apparatus. The first drive chip is one of the plurality of drive chips and is connected to the controller and the data acquisition apparatus respectively, and the apparatus 60 includes:

a first receiving module 601, configured to receive component-related data acquired by the data acquisition apparatus.

a sending module 602 is configured to send backhaul data to the controller, and the backhaul data includes the component-related data.

In summary, in the data transmission apparatus according to the embodiment of the present disclosure, the receiving module may receive the component-related data acquired by the data acquisition apparatus and transmit the component-related data to the controller over the backhaul data by the sending module. In this way, bidirectional data transmission between the controller and the drive chip is achieved, thereby enriching functions of the drive chip and improving utilization rate of the drive chip.

Optionally, the controller is connected to the first drive chip by the first differential signal line.

Figure 11:
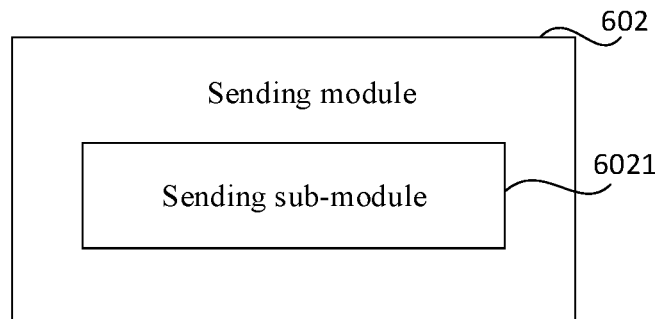
FIG. 11 is a block diagram of a sending module according to an exemplary embodiment of the present disclosure.

Optionally, as shown in FIG. 11, the sending module 602 includes:

a sending sub-module 6021, configured to send the backhaul data to the controller over the first differential signal line.

Figure 12:
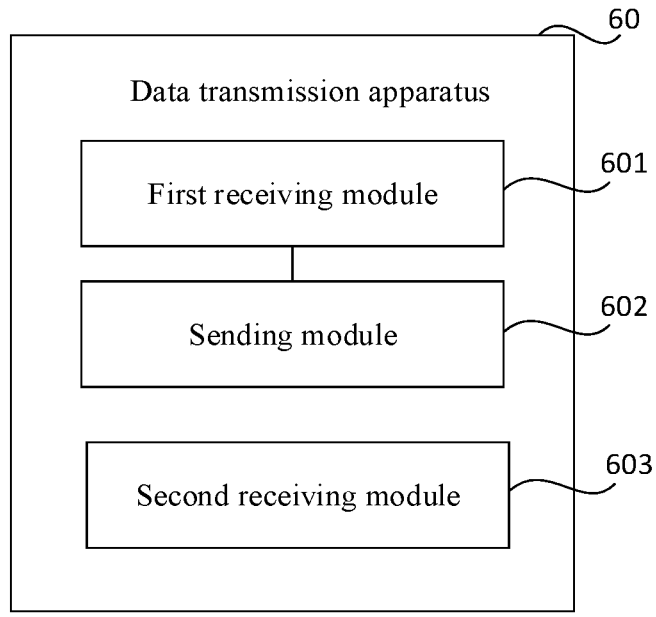
FIG. 12 is a block diagram of another data transmission apparatus according to an exemplary embodiment.

Optionally, the controller is connected to the first drive chip by a second differential signal line, and as shown in FIG. 12, the apparatus 60 further includes:

a second receiving module 603, configured to receive a control signal sent by the controller over the second differential signal line.

The sending sub-module 6021 is configured to:

send the backhaul data to the controller in real time over the first differential signal line.

Optionally, the data acquisition apparatus includes at least one of a camera component, an audio acquisition component, a display panel, a touch panel, and a sensor.

Optionally, in the case that the data acquisition apparatus includes the camera component, the component-related data includes image data.

In the case that the data acquisition apparatus includes the audio acquisition component, the component-related data includes voice data.

In the case that the data acquisition apparatus includes the display panel, the component-related data may include first indication information indicating whether operating state of the display panel is abnormal.

In the case that the data acquisition apparatus includes the sensor, the component-related data includes data collected by the sensor.

In the case that the data acquisition apparatus includes the touch panel, the component-related data includes touch data.

Optionally, the sensor includes at least one of a fingerprint sensor, a temperature sensor, a position sensor, an infrared sensor, and an ultrasonic sensor.

Optionally, the touch data includes at least one of touch position data and touch pressure data.

Optionally, the backhaul data further includes at least one of the operating pattern data of the drive chip and the second indication information indicating whether the operating state of the drive chip is abnormal.

Figure 13:
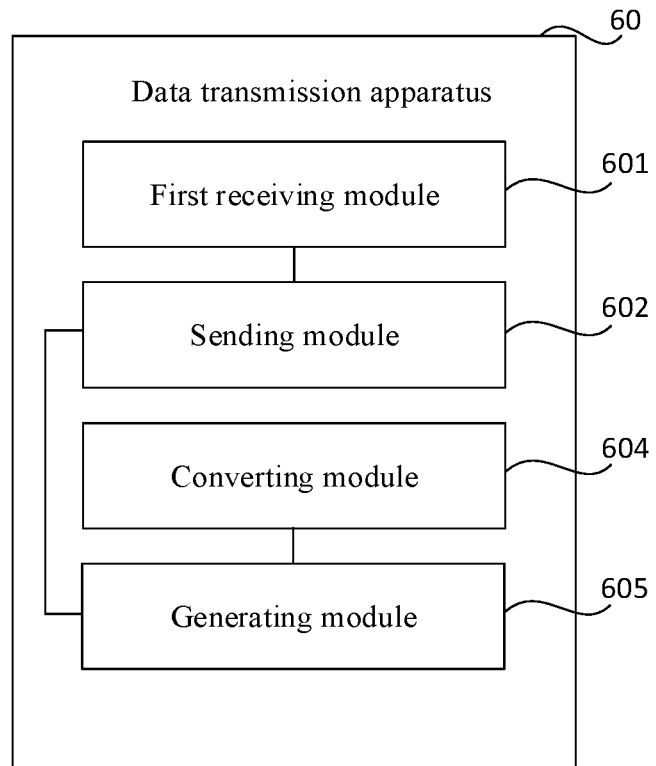
FIG. 13 is a block diagram of still another data transmission apparatus according to an exemplary embodiment.

Optionally, as shown in FIG. 13, the apparatus 60 further includes:

a converting module 604, configured to perform analog-to-digital conversion on the component-related data in an analog signal form before sending the backhaul data to the controller, so as to acquire the component-related data in a digital signal form; and a generating module 605, configured to generate the backhaul data that includes the component-related data in the digital signal form.

Optionally, the drive chips are source drive chips.

The controller is any one of a timing controller, a system on chip (SOC), and a microcontroller unit (MCU) integrated in the timing controller.

In summary, in the data transmission apparatus according to the embodiment of the present disclosure, the receiving module may receive the component-related data acquired by the data acquisition apparatus and transmit the component-related data to the controller over the backhaul data by the sending module. In this way, bidirectional data transmission between the controller and the drive chip is achieved, thereby enriching functions of the drive chip and improving utilization rate of the drive chip.

Figure 14:
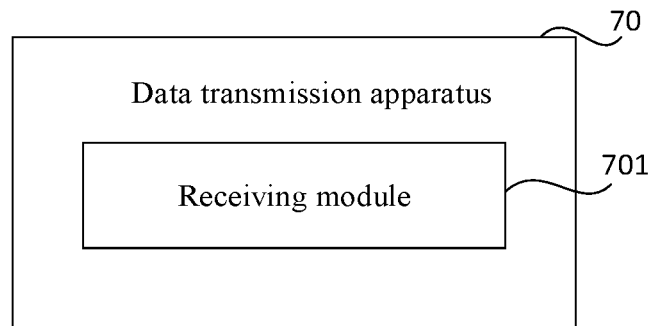
FIG. 14 is a block diagram of a data transmission apparatus according to another exemplary embodiment.

An embodiment of the present disclosure provides a data transmission apparatus 70, as shown in FIG. 14. The apparatus is applicable to a controller in a display device that includes the controller, a plurality of drive chips and a data acquisition apparatus. The first drive chip is one of the plurality of drive chips and connected to the controller and the data acquisition apparatus respectively, and the apparatus 70 includes:

a receiving module 701, configured to receive backhaul data sent by the first drive chip, and the backhaul data includes component-related data.

The backhaul data is sent to the controller by the first drive chip after receiving the component-related data acquired by the data acquisition apparatus.

In summary, in the data transmission apparatus according to the embodiment of the present disclosure, the first drive chip may receive the component-related data acquired by the data acquisition apparatus and transmit the component-related data to the receiving module of the controller over the backhaul data. In this way, bidirectional data transmission between the controller and the drive chip is achieved, thereby enriching functions of the drive chip and improving utilization rate of the drive chip.

Figure 15:
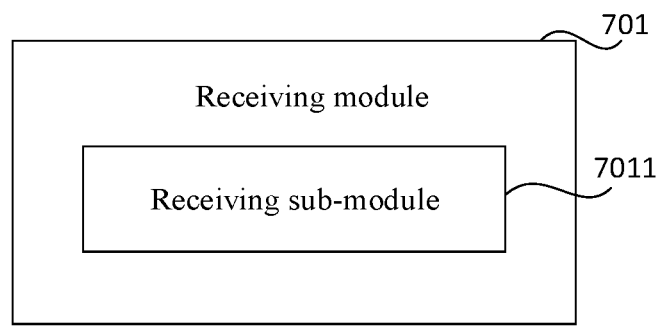
FIG. 15 is a block diagram of a receiving module according to another exemplary embodiment of the present disclosure.

Optionally, the controller is connected to the first drive chip by a first differential signal line, and as shown in FIG. 15, the controller 701 includes:

a receiving sub-module 7011, configured to receive the backhaul data sent by the first drive chip over the first differential signal line.

Figure 16:
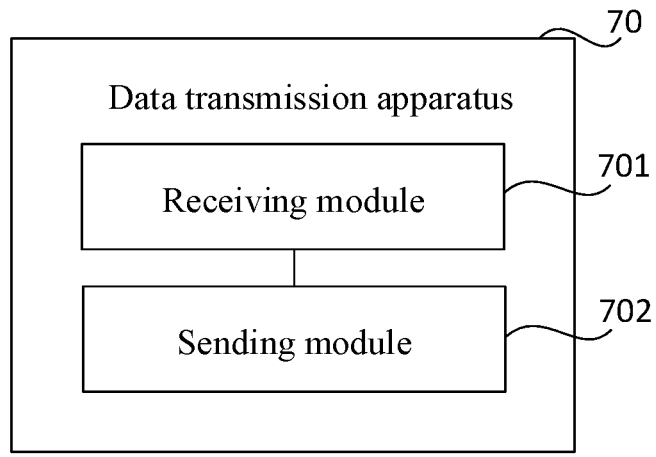
FIG. 16 is a block diagram of another data transmission apparatus according to another exemplary embodiment.

Optionally, as shown in FIG. 16, the controller is connected to the first drive chip by a second differential signal line, and the apparatus 70 further includes:

a sending module 702, configured to send a control signal to the first drive chip over the second differential signal line.

The receiving sub-module 7011 is configured to:

receive the backhaul data sent by the first drive chip in real time over the first differential signal line.

Optionally, signals transmitted over the first differential signal line are transmitted in a form of data packets, and each of the data packets includes a start bit, a data bit and a stop bit that are arranged in sequence.

The start bit is intended to indicate start of data transmission, the data bit is intended to carry data to be transmitted, and the stop bit is intended to indicate stop of the data transmission.

Optionally, each of the data packets further includes: a setting mode bit and a pattern setting bit that are arranged in sequence between the start bit and the data bit, and a check bit between the data bit and the stop bit.

The setting mode bit is intended to indicate a mode for setting a pattern of the data packet, the pattern setting bit is intended to indicate a pattern of the data packet, and the check bit is intended to perform data check, the pattern of the data packet including a require pattern or a response pattern.

Optionally, the controller is any one of a timing controller, a system on chip (SOC), and a microcontroller unit (MCU) integrated in the timing controller.

Optionally, the data acquisition apparatus may include at least one of a camera component, an audio acquisition component, a display panel, a touch panel, and a sensor.

Optionally, in the case that the data acquisition apparatus includes the camera component, the component-related data includes image data.

In the case that the data acquisition apparatus includes the audio acquisition component, the component-related data includes voice data.

In the case that the data acquisition apparatus includes the display panel, the component-related data includes first indication information indicating whether operating state of the display panel is abnormal.

In the case that the data acquisition apparatus includes the sensor, the component-related data includes data collected by the sensor.

In the case that the data acquisition apparatus includes the touch panel, the component-related data includes touch data.

Optionally, the sensor includes at least one of a fingerprint sensor, a temperature sensor, a position sensor, an infrared sensor, and an ultrasonic sensor.

Optionally, the touch data includes at least one of touch position data and touch pressure data.

Optionally, the backhaul data further includes at least one of the operating pattern data of the drive chip and the second indication information indicating whether the operating state of the drive chip is abnormal.

Figure 17:
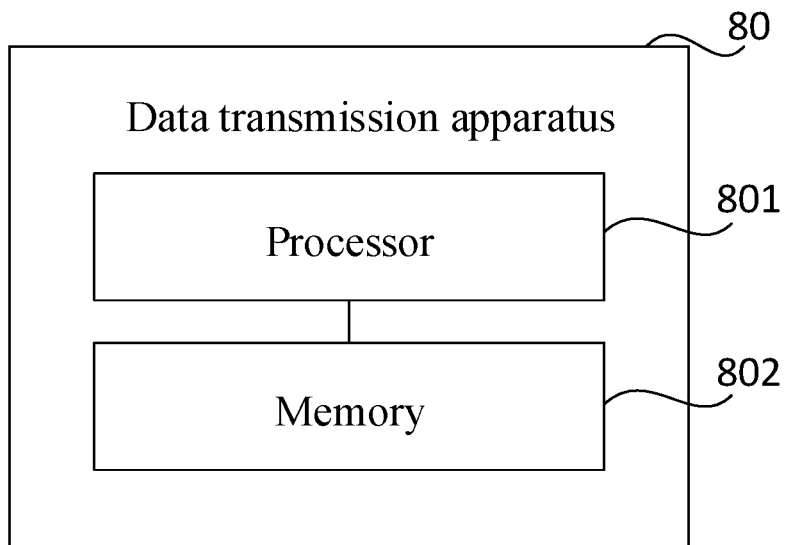
FIG. 17 is a block diagram of a data transmission apparatus according to still another exemplary embodiment.

According to an embodiment of the present disclosure, a data transmission device 80 is provided as shown in FIG. 17 and applied to a first drive chip in a display device that includes a controller, a plurality of drive chips and a data acquisition apparatus. The first drive chip is one of the plurality of drive chips and being connected to the controller and the data acquisition apparatus respectively, and the device includes:

a processor 801;

a memory 802, configured to store at least one executable instruction of the processor;

wherein the processor is configured to perform the data transmission method according to the embodiment of the present disclosure when the at least one executable instruction is executed by the processor.

Figure 18:
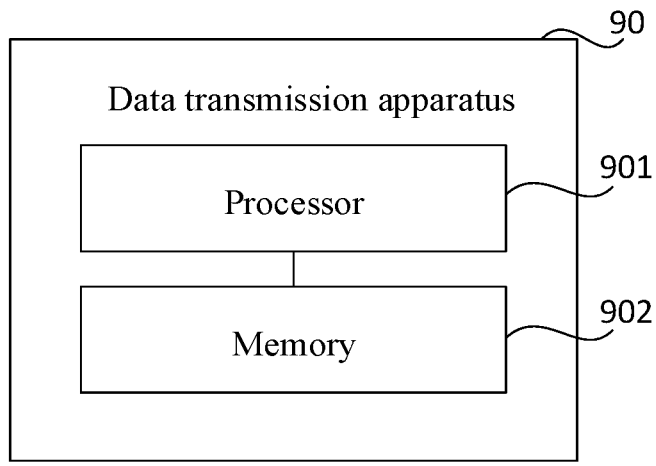
FIG. 18 is a block diagram of another data transmission apparatus according to still another exemplary embodiment.

According to an embodiment of the present disclosure, a data transmission device 90 is provided as shown in FIG. 18 and applicable to a controller in a display device that includes the controller, a plurality of drive chips and a data acquisition apparatus. The first drive chip is one of the plurality of drive chips and being connected to the controller and the data acquisition apparatus respectively, and the device includes:

a processor 901;

a memory 902, configured to store at least one executable instruction of the processor;

wherein the processor is configured to perform the data transmission method according to the embodiment of the present disclosure when the at least one executable instruction is executed by the processor.

The embodiment of the present disclosure provides a display screen. The display screen includes a display panel and a panel drive circuit. The panel drive circuit includes a controller and a plurality of drive chips, and the plurality of drive chips includes a first drive chip.

The controller includes the data transmission apparatus as shown in FIG. 14 or 16, and the first drive chip includes the data transmission apparatus as shown in FIG. 10, 12 or 13.

Alternatively, the controller includes the data transmission device as shown in FIG. 18, and the first drive chip includes the data transmission device as shown in FIG. 17.

Exemplarily, the display panel may be a liquid crystal panel or an OLED panel.

The controller and the first drive chip are connected by a first differential signal line, and the first differential signal line is configured to transmit the backhaul data sent by the first drive chip in real time to the controller.

The controller is connected to the plurality of drive chips by a second differential signal line, respectively, and each of the second differential signal lines is configured to transmit a control signal sent by the controller to a corresponding drive chip. For the connection relationship between the controller and the drive chip in the display screen, a reference may be made to the aforesaid connection relationship as shown in any one of FIGS. 1 to 3 and FIG. 9.

Furthermore, the embodiment of the present disclosure further provides a display device. The display device includes the aforesaid display screen, and further a data acquisition apparatus that is connected to the first drive chip and configured to acquire and send the component-related data to the first drive chip.

The data acquisition apparatus may include at least one of a camera component, an audio acquisition component, a display panel, a touch panel, and a sensor. For the connection relationship between the drive chip and the data acquisition apparatus in the display device, a reference may be made to the aforesaid connection relationships in any one of FIGS. 1 to 3 and FIG. 9. Exemplarily, the display device may be any product or component having a display function, such as a liquid crystal screen, a piece of electronic paper, an OLED screen, a mobile phone, a tablet computer, a TV set, a display, a notebook computer, a digital photo frame, a navigator etc.

Figure 19:
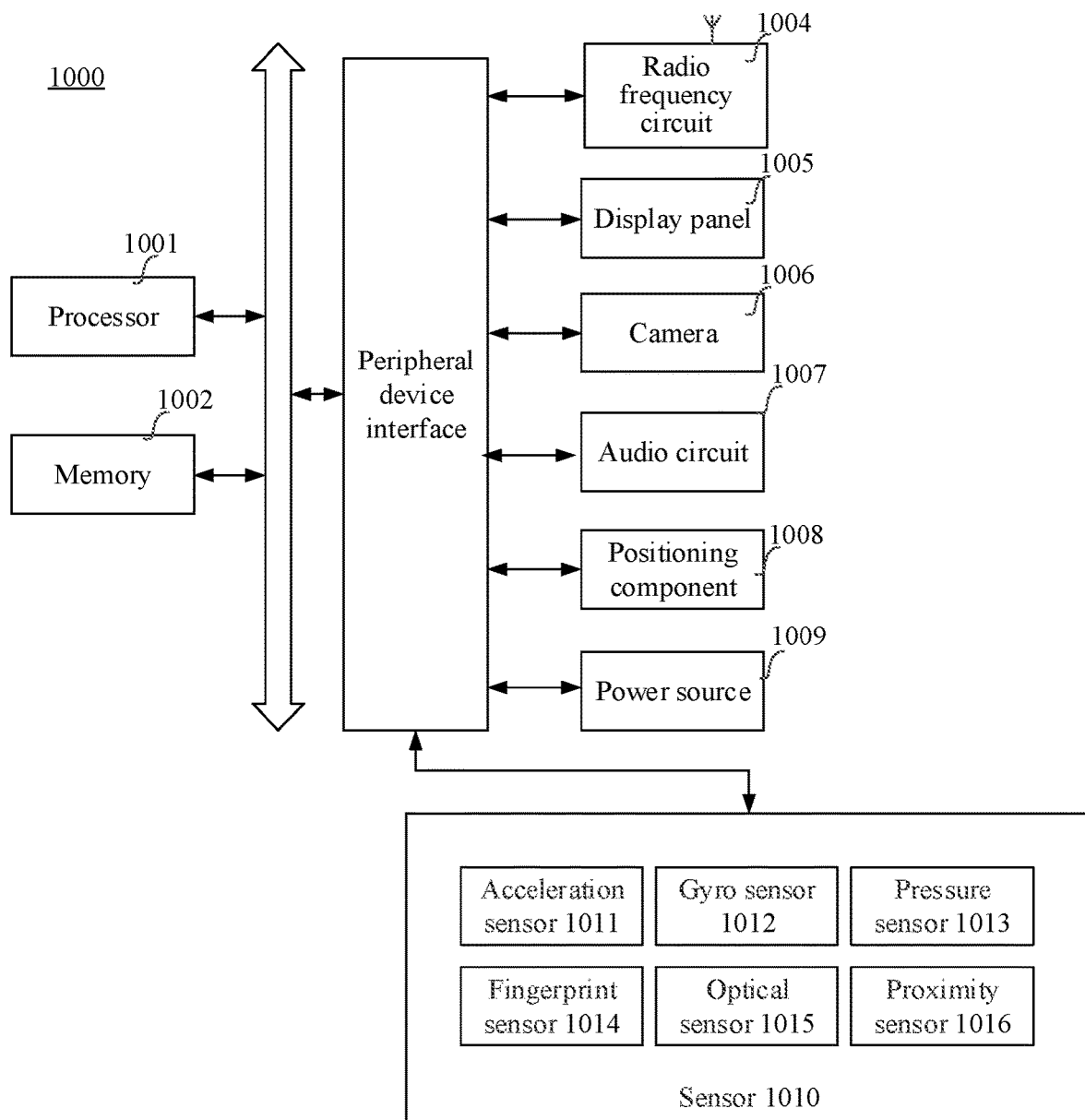
FIG. 19 is a block diagram of a display device according to an exemplary embodiment of the present disclosure.

FIG. 19 is a structural block diagram of a display device 1000 according to an exemplary embodiment of the present disclosure. The device 1000 may be any product or component having a display function, such as a liquid crystal panel, electronic paper, an OLED panel, a mobile phone, a tablet computer, a television, a display, a notebook computer, a digital photo frame and a navigator. Generally, the device 1000 includes a processor 1001 and a memory 1002.

The processor 1001 may include at least one processing core, such as a 4-core processor and an 8-core processor. The processor 1001 may be practiced by at least one of hardware forms of a digital signal processing (DSP), a field-programmable gate array (FPGA), and a programmable logic array (PLA). The processor 1001 may also include a main processor and a coprocessor. The main processor is a processor for processing data in an awaken state, and is also referred to as central processing unit (CPU). The coprocessor is a low-power consumption processor for processing data in a standby state. In some embodiments, the processor 1001 may be integrated with a graphics processing unit (GPU), which is responsible for rendering and drawing of content that needs to be displayed on a display panel. In some embodiments, the processor 1001 may further include an artificial intelligence (AI) processor, configured to process computational operations related to machine learning.

The memory 1002 may include at least one computer readable storage medium, which may be non-transitory. The memory 1002 may also include a high-speed random-access memory, and a non-volatile memory such as at least one magnetic disk storage devices and flash memory storage devices. In some embodiments, the non-transitory computer readable storage medium in the memory 1002 is configured to store at least one instruction. The at least one instruction is configured to be executed by the processor 1001 to perform the data transmission method according to the method embodiments of the present disclosure.

In some embodiments, the device 1000 optionally further includes a peripheral device interface 1003 and at least one peripheral device. The processor 1001, the memory 1002, and the peripheral device interface 1003 may be connected by a bus or a signal line. Each peripheral device may be connected to the peripheral device interface 1003 by a bus, a signal line, or a circuit board. Specifically, the peripheral device includes at least one of a radio frequency circuit 1004, a display panel 1005, a camera 1006, an audio circuit 1007, a positioning component 1008, and a power source 1009.

The peripheral device interface 1003 may be configured to connect at least one input/output (I/O)-associated peripheral device to the processor 1001 and the memory 1002. In some embodiments, the processor 1001, the memory 1002, and the peripheral interface 1003 are integrated on the same chip or circuit board. In some other embodiments, any one or two of the processor 1001, the memory 1002, and the peripheral interface 1003 can be practiced on a separate chip or circuit board, which is not limited in the present embodiment.

The radio frequency circuit 1004 is configured to receive and transmit a radio frequency (RF) signal, also referred to as an electromagnetic signal. The radio frequency circuit 1004 communicates with the communication network and other communication devices via the electromagnetic signal. The radio frequency circuit 1004 is configured to convert the electrical signal into the electromagnetic signal for sending, or converts the received electromagnetic signal into the electrical signal. Optionally, the radio frequency circuit 1004 includes an antenna system, an RF transceiver, at least one amplifier, a tuner, an oscillator, a digital signal processor, a coding and decoding chipset, a subscriber identity module card, and the like. The radio frequency circuit 1004 can communicate with other devices using at least one wireless communication protocol. The wireless communication protocol includes, but not limited to, the world wide web, a metropolitan area network, an intranet, various generations of mobile communication networks (2G, 3G, 4G, and 5G), a wireless local area network, and/or a wireless fidelity (Wi-Fi) network. In some embodiments, the radio frequency circuit 1004 may also include a near field communication (NFC) related circuit, which is not limited in the present disclosure.

The display panel 1005 is configured to display a user interface (UI). The UI can include graphics, texts, icons, videos, and any combination thereof. When the display panel 1005 is a touch display panel (i.e., a panel integrating functions of a touch panel and a display panel), the display panel 1005 also has the capability of capturing a touch signal on the surface or over the surface of the display panel 1005. The touch signal may be input to the processor 1001 as a control signal for processing. At this point, the display panel 1005 may also be configured to provide virtual buttons and/or a virtual keyboard, which are also referred to as soft buttons and/or soft keyboard. In some embodiments, one display panel 1005 is arranged, and arranged at the front panel of the device 1000. In other embodiments, at least two display panels 1005 are arranged, and are respectively arranged on different surfaces of the device 1000 or in a folded design. In still other embodiments, the display panel 1005 may be a flexible display panel disposed on a curved surface or folded surface of the device 1000. The display panel 1005 may even be set to a non-rectangular irregular pattern, that is, irregular panel. The display panel 1005 may include a liquid crystal display (LCD) panel or an organic light-emitting diode (OLED) display panel.

The camera component 1006 is configured to capture images or videos. Optionally, the camera component 1006 includes a front camera and a rear camera. Typically, the front camera is arranged on the front panel of the device and the rear camera is arranged on the back surface of the device. In some embodiments, at least two rear cameras are arranged and are respectively any one type of a main camera, a depth camera, a wide-angle camera, and a telephoto camera, so as to realize the background blur function realized by fusion of the main camera and the depth camera, the panoramic shooting and virtual reality (VR) shooting realized by fusion of the main camera and the wide-angle camera, or other fused shooting functions. In some embodiments, the camera component 1006 may also include a flash. The flash may be a monochrome temperature flash or a two-color temperature flash. The two-color temperature flash is a combination of a warm flash and a cool flash and may be used for light compensation at different color temperatures.

The audio circuit 1007 may include a microphone and a loudspeaker. The microphone is configured to collect sound waves of the user and the environment, and convert the sound waves into electrical signals for being input to the processor 1001 for processing, or being input to the radio frequency circuit 1004 for voice communication. For the purpose of stereo acquisition or noise reduction, a plurality of microphones may be arranged, and are respectively arranged at different portions of the device 1000. The microphone may also be an array microphone or an omni-directional acquisition microphone. The loudspeaker is then configured to convert the electrical signals from the processor 1001 or the radio frequency circuit 1004 into the sound waves. The loudspeaker may be a conventional film loudspeaker or a piezoelectric ceramic loudspeaker. When the loudspeaker is the piezoelectric ceramic loudspeaker, not only can the electrical signals be converted into the sound waves audible to humans, but also the electrical signals may be converted into the sound waves inaudible to humans for the purpose such as ranging. In some embodiments, the audio circuit 1007 may also include a headphone jack.

The positioning component 1008 is configured to position the current geographic location of the device 1000 to implement navigation or location based services (LBS). The positioning component 1008 may be a positioning component based on the global positioning system (GPS) from the United States, the Beidou positioning system from China, the Grenas satellite positioning system from Russia or the Galileo satellite navigation system from the European Union.

The power source 1009 is configured to supply power for various components in the device 1000. The power source 1009 may be an alternating current, a direct current, a disposable battery, or a rechargeable battery. When the power source 1009 includes the rechargeable battery, the rechargeable battery may be a wired rechargeable battery or a wireless rechargeable battery. The wired rechargeable battery is a battery that is recharged by a wired line. The wireless rechargeable battery is a battery that is recharged by wireless coil. The rechargeable battery may also be configured to support the fast charging technology.

In some embodiments, the device 1000 also includes at least one sensor 1010. The at least one sensor 1010 include, but not limited to, an acceleration sensor 1011, a gyro sensor 1012, a pressure sensor 1013, a fingerprint sensor 1014, an optical sensor 1015, and a proximity sensor 1016.

The acceleration sensor 1011 may detect the size of the acceleration on the three coordinate axes of a coordinate system established by the device 1000. For example, the acceleration sensor 1011 may be configured to detect the components of gravity acceleration on the three coordinate axes. The processor 1001 may control the touch display panel 1005 to display a user interface in a landscape view or a portrait view according to the gravity acceleration signal collected by the acceleration sensor 1011. The acceleration sensor 1011 may also be used for collecting game or user motion data.

The gyro sensor 1012 may detect the body direction and the rotation angle of the device 1000, and the gyro sensor 1012 may cooperate with the acceleration sensor 1011 to collect the 3D motion of the user on the device 1000 synergistically. According to the data collected by the gyro sensor 1012, the processor 1001 may implement the following functions of motion sensing (for example, changing the UT according to the tilting operation of the user), image stabilization at the time of shooting, game control, and inertial navigation.

The pressure sensor 1013 may be arranged on a side frame of the device 1000 and/or a lower layer of the touch display panel 1005. When the pressure sensor 1013 is arranged on the side frame of the device 1000, the holding signal of the user for the device 1000 may be detected, and the processor 1001 performs left and right-hand recognition or shortcut operation according to the holding signal collected by the pressure sensor 1013. When the pressure sensor 1013 is arranged on the lower layer of the touch display panel 1005, the processor 1001 controls an operability control on the UI interface according to the pressure operation of the user on the touch display panel 1005. The operability control includes at least one of a button control, a scroll bar control, an icon control, and a menu control.

The fingerprint sensor 1014 is configured to collect the fingerprint of the user, and the processor 1001 identifies the identity of the user according to the fingerprint collected by the fingerprint sensor 1014, or the fingerprint sensor 1014 identifies the identity of the user according to the collected fingerprint. When identifying that the identity of the user is a trusted identity, the processor 1001 authorizes the user to perform related sensitive operations, including unlocking the screen, viewing encrypted information, downloading software, paying and changing settings, and the like. The fingerprint sensor 1014 may be arranged on the front, back or side surface of the device 1000. When the device 1000 is provided with a physical button or manufacturer logo, the fingerprint sensor 1014 may be integrated with a physical button or vendor logo.

The optical sensor 1015 is configured to collect ambient light intensity, in one embodiment, the processor 1001 may control the display brightness of the touch display panel 1005 based on the ambient light intensity collected by the optical sensor 1015. Specifically, when the ambient light intensity is relatively high, the display brightness of the touch display panel 1005 is raised. When the ambient light intensity is relatively low, the display brightness of the touch display panel 1005 is lowered. In another embodiment, the processor 1001 may also dynamically adjust the shooting parameters of the camera component 1006 based on the ambient light intensity collected by the optical sensor 1015.

The proximity sensor 1016, also referred to as a distance sensor, is typically arranged on the front panel of the device 1000. The proximity sensor 1016 is configured to capture the distance between the user and the front surface of the device 1000. In one embodiment, when the proximity sensor 1016 detects that the distance between the user and the front surface of the device 1000 gradually decreases, the touch screen 1005 is controlled by the processor 1001 to switch from a bright screen state to a dark screen state. When the proximity sensor 1016 detects that the distance between the user and the front surface of the device 1000 gradually increases, the processor 1001 controls the touch display panel 1005 to switch from the dark screen state to the bright screen state.

It will be understood by those skilled in the art that the structure shown in FIG. 25 does not constitute a limitation on the device 1000, and may include more or less components than those illustrated, or combine some components or adopt different component arrangements.

An embodiment of the present disclosure provides a computer-readable storage medium storing at least one instruction therein. When the computer-readable storage medium runs in a processing component, the processing component may perform the data transmission method according to the embodiments of the present disclosure.

An embodiment of the present disclosure provides a chip. The chip includes a programmable logic circuit and/or program instruction. The chip is configured to perform the data transmission method according to the embodiments of the present disclosure when the chip operates.

An embodiment of the present disclosure also provides a computer program product storing at least one instruction therein. When the computer program product runs on a computer, the computer is caused to perform the data transmission method according to the embodiments of the present disclosure.

With regard to the device in the aforesaid embodiments, the specific manner in which the respective modules perform the operations has been described in detail in embodiments of the method, and will not be explained in detail herein.

Other embodiments of the present disclosure will be apparent to those skilled in the art from consideration of the specification and practice of the present disclosure. The present disclosure is intended to cover any variations, uses, or adaptations of the present disclosure following the general principles thereof and including common knowledge or commonly used technical measures which are not disclosed herein. The specification and embodiments are to be considered as exemplary only, and the true scope and spirit of the present disclosure are indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure is only limited by the appended claims.

What is claimed is:

1. A data transmission method, applicable to a first drive chip in a display device that comprises a controller, a plurality of drive chips and a data acquisition apparatus, the first drive chip being one of the plurality of drive chips and being connected to the controller and the data acquisition apparatus respectively, and the controller being connected to the first drive chip by a first differential signal line,
   the method comprising:
   receiving component-related data acquired by the data acquisition apparatus; and
   sending backhaul data to the controller over the first differential signal line, the backhaul data comprising the component-related data,
   wherein signals transmitted over the first differential signal line are transmitted in a form of data packets, each of the data packets comprising a start bit, a setting mode bit, a pattern setting bit, a data bit, a check bit and a stop bit that are arranged in sequence; wherein the start bit is intended to indicate start of data transmission, the setting mode bit is intended to indicate a mode for setting a pattern of the data packet, the pattern setting bit is intended to indicate a pattern of the data packet, the data bit is intended to carry data to be transmitted, the check bit is intended to perform data check and the stop bit is intended to indicate stop of the data transmission, the pattern of the data packet comprising a require pattern or a response pattern.

2. The method according to claim 1, wherein the controller is connected to the first drive chip by a second differential signal line; and the method further comprises:
   receiving a control signal sent by the controller over the second differential signal line; and
   sending the backhaul data to the controller over the first differential signal line comprises:
   sending the backhaul data to the controller in real time over the first differential signal line.

3. The method according to claim 1, wherein the data acquisition apparatus comprises at least one of a camera component, an audio acquisition component, a display panel, a touch panel, and a sensor.

4. The method according to claim 3, wherein
   in the case that the data acquisition apparatus comprises the camera component, the component-related data comprises image data;

in the case that the data acquisition apparatus comprises the audio acquisition component, the component-related data comprises voice data;

in the case that the data acquisition apparatus comprises the display panel, the component-related data comprises first indication information indicating whether operating state of the display panel is abnormal;

in the case that the data acquisition apparatus comprises the sensor, the component-related data comprises data collected by the sensor; and in the case that the data acquisition apparatus comprises the touch panel, the component-related data comprises touch data.

5. The method according to claim 1, wherein before sending the backhaul data to the controller, the method further comprises:

performing analog-to-digital conversion on the component-related data in an analog signal form to acquire the component-related data in a digital signal form; and generating the backhaul data that comprises the component-related data in the digital signal form.

6. The method according to claim 1, wherein
the drive chips are source drive chips; and
the controller is any one of a timing controller, a system on chip (SOC) and a microcontroller unit (MCU) integrated in the timing controller.

7. A data transmission method, applicable to a controller in a display device that comprises the controller, a plurality of drive chips and a data acquisition apparatus, the first drive chip being one of the plurality of drive chips and being connected to the controller and the data acquisition apparatus respectively, and the controller being connected to the first drive chip by a first differential signal line, the method comprising:

receiving backhaul data sent by the first drive chip over the first differential signal line, the backhaul data comprising component-related data; wherein the backhaul data is sent to the controller by the first drive chip after receiving the component-related data acquired by the data acquisition apparatus;

wherein signals transmitted over the first differential signal line are transmitted in a form of data packets, each of the data packets comprising a start bit, a setting mode bit, a pattern setting bit, a data bit, a check bit and a stop bit that are arranged in sequence; wherein the start bit is intended to indicate start of data transmission, the setting mode bit is intended to indicate a mode for setting a pattern of the data packet, the pattern setting bit is intended to indicate a pattern of the data packet, the data bit is intended to carry data to be transmitted, the check bit is intended to perform data check and the stop bit is intended to indicate stop of the data transmission, the pattern of the data packet comprising a require pattern or a response pattern.

8. The method according to claim 7, wherein the controller is connected to the first drive chip by a second differential signal line; and the method further comprises:

sending a control signal to the first drive chip over the second differential signal line; and receiving the backhaul data sent by the first drive chip over the first differential signal line comprises:

receiving the backhaul data sent by the first drive chip in real time over the first differential signal line.

9. The method according to claim 7, wherein
the data acquisition apparatus comprises at least one of a camera component, an audio acquisition component, a display panel, a touch panel, and a sensor;

the drive chips are source drive chips; and
the controller is any one of a timing controller, a system on chip (SOC) and a microcontroller unit (MCU) integrated in the timing controller.

10. A data transmission device, applicable to a controller in a display device that comprises the controller, a plurality of drive chips and a data acquisition apparatus, the first drive chip being one of the plurality of drive chips and being connected to the controller and the data acquisition apparatus respectively, and the device comprising:

a processor;

a memory, configured to store at least one executable instruction of the processor, wherein the processor is configured to perform the data transmission method as defined in claim 7 when the at least one executable instruction is executed by the processor.

11. A display screen, comprising: a display panel and a panel drive circuit, wherein the panel drive circuit comprises a controller and a plurality of drive chips, the plurality of drive chips comprising a first drive chip;

wherein the controller comprises the data transmission device as defined in claim 10, and the first drive chip comprises a data transmission device comprising:

a processor;

a memory, configured to store at least one executable instruction of the processor; wherein when the at least one executable instruction is executed by the processor, the processor is configured to perform:

receiving component-related data acquired by the data acquisition apparatus; and sending backhaul data to the controller, the backhaul data comprising the component-related data.

12. The display screen according to claim 11, wherein
the controller is connected to the first drive chip by a first differential signal line, and the first differential signal line is configured to transmit the backhaul data sent by the first drive chip to the controller in real time; and the controller is connected to the plurality of drive chips by second differential signal lines respectively, and each of the second differential signal lines is configured to transmit a control signal sent by the controller to a corresponding drive chip.

13. A display device, comprising: a display screen as defined in claim 11, and further comprising: a data acquisition apparatus that is connected to the first drive chip and configured to acquire and send component-related data to the first drive chip.

14. A data transmission device, applicable to a first drive chip in a display device that comprises a controller, a plurality of drive chips and a data acquisition apparatus, the first drive chip being one of the plurality of drive chips and being connected to the controller and the data acquisition apparatus respectively, the controller being connected to the first drive chip by a first differential signal line, and the device comprising:

a processor;

a memory, configured to store at least one executable instruction of the processor; wherein when the at least one executable instruction is executed by the processor, the processor is configured to perform:

receiving component-related data acquired by the data acquisition apparatus; and sending backhaul data to the controller over the first differential signal line, the backhaul data comprising the component-related data, wherein signals transmitted over the first differential signal line are transmitted in a form of data packets, each of the data packets comprising a start bit, a setting mode bit, a pattern setting bit, a data bit, a check bit and a stop bit that are arranged in sequence; wherein the start bit is intended to indicate start of data transmission, the setting mode bit is intended to indicate a mode for setting a pattern of the data packet, the pattern setting bit is intended to indicate a pattern of the data packet, the data bit is intended to carry data to be transmitted, the check bit is intended to perform data check and the stop bit is intended to indicate stop of the data transmission, the pattern of the data packet comprising a require pattern or a response pattern.

\* \* \* \* \*